US012527509B2

(12) United States Patent
Gerashchenko

(10) Patent No.: US 12,527,509 B2
(45) Date of Patent: Jan. 20, 2026

(54) DEVICE AND METHOD FOR RECORDING BIOPOTENTIALS IN LABORATORY ANIMALS

(71) Applicant: Ludmila Gerashchenko, Chestnut Hill, MA (US)

(72) Inventor: Ludmila Gerashchenko, Chestnut Hill, MA (US)

( * ) Notice: Subject to any disclaimer, the term of this patent is extended or adjusted under 35 U.S.C. 154(b) by 438 days.

(21) Appl. No.: 18/122,762

(22) Filed: Mar. 17, 2023

(65) Prior Publication Data

US 2023/0301575 A1   Sep. 28, 2023

Related U.S. Application Data

(60) Provisional application No. 63/324,054, filed on Mar. 26, 2022.

(51) Int. Cl.
*A61B 5/296* (2021.01)
*A61B 5/262* (2021.01)
*A61D 3/00* (2006.01)
*A61D 7/00* (2006.01)

(52) U.S. Cl.
CPC .............. *A61B 5/296* (2021.01); *A61B 5/262* (2021.01); *A61D 3/00* (2013.01); *A61D 7/00* (2013.01); *A61B 2503/40* (2013.01); *A61B 2503/42* (2013.01)

(58) Field of Classification Search
CPC ..... A61B 5/262; A61B 5/296; A61B 2503/40; A61B 2503/42; A61D 1/00; A61D 3/00
See application file for complete search history.

(56) References Cited

U.S. PATENT DOCUMENTS

| 8,238,995 B2 * | 8/2012 | Chandrasekaran .... A61B 5/296 600/386 |
| 9,173,583 B2 * | 11/2015 | Chen ................... H01L 21/6836 |
| 11,547,849 B2 * | 1/2023 | Hetke ..................... A61B 5/686 |
| 2002/0028991 A1 * | 3/2002 | Thompson ............. A61B 5/282 977/734 |

(Continued)

FOREIGN PATENT DOCUMENTS

| CN | 105616034 A | * | 6/2016 | ............... A61D 3/00 |
| CN | 114515152 A | * | 5/2022 | ............. A61B 5/262 |

(Continued)

*Primary Examiner* — Michael H Wang
(74) *Attorney, Agent, or Firm* — Law Office of Ilya Libenzon

(57) ABSTRACT

A head stage designed for non-surgical placement of EEG electrodes in small animals is disclosed. The head stage is connected to thin barbed pin electrodes of multiple lengths, such that they can be placed into the brain at the chosen depth. A miniature device comprising a wireless transmitter or data logger can be attached using magnets or connectors to the stage. When the head stage is placed on the head of a small animal and pressure is applied on the stage, the set of pin electrodes penetrate the skull, such that the stage becomes firmly fixed to the skull. Further, the device includes electrodes on its body that eliminate the need of wires for EEG recordings. When the capsule including sharp electrodes is pressed toward the skull, the electrodes penetrate the bone and fixes the capsule onto the skull for recording biopotential signals from the brain.

12 Claims, 16 Drawing Sheets

(56) References Cited

U.S. PATENT DOCUMENTS

| | | | | |
|---|---|---|---|---|
| 2004/0054393 | A1* | 3/2004 | Stemme | A61B 5/257 600/372 |
| 2008/0009763 | A1* | 1/2008 | Chiou | A61B 5/266 600/393 |
| 2012/0143280 | A1* | 6/2012 | Hasulak | A61N 1/36017 607/45 |
| 2021/0169334 | A1* | 6/2021 | Kodandaramaiah | A61B 5/14546 |
| 2023/0263608 | A1* | 8/2023 | Totah | A61B 5/293 128/97.1 |

FOREIGN PATENT DOCUMENTS

| | | | | |
|---|---|---|---|---|
| CN | 117796822 A | * | 4/2024 | A61B 5/6848 |
| CN | 118304043 A | * | 7/2024 | A61B 5/031 |
| CN | 118648902 A | * | 9/2024 | A61B 5/685 |
| WO | WO-2025098139 A1 | * | 5/2025 | A61N 1/36 |

* cited by examiner

DEVICE AND METHOD FOR RECORDING BIOPOTENTIALS IN LABORATORY ANIMALS

RELATED APPLICATION DATA

This application claims the priority of prior U.S. provisional application Ser. No. 63/324,054 filed on Mar. 26, 2022, which is hereby incorporated by reference herein in its entirety.

FIELD OF INVENTION

Embodiments of the present disclosure relate to devices and methods of recording biopotentials in freely moving laboratory animals. These devices and methods will be particularly useful for performing high-throughput recordings of biopotentials and physiological parameters (EEG, EMG, ECG, temperature, blood pressure, locomotion, and the like) in freely moving mice in both academic institutions and commercial laboratories.

BACKGROUND

Generally, the animals are used in scientific research to understand biomedical systems that lead to the development of useful drugs, therapies, and cures for diseases and pathologies. Mice are commonly used in biological research for multiple reasons, such as they are easily housed and maintained, they are relatively inexpensive, they reproduce quickly, their biological and behaviour characteristics closely resemble those of humans, their various transgenic models are available, and the like. Approximately 20-30 million mice are used each year in the United States for biological and medical research. Mice are used in research much more than any other animals. For many experiments, it is imperative that EEG recordings are conducted using alert, and freely moving mice. However, recording EEG is technically more difficult in animals as compared to humans. While human participants can be instructed to comply with the placement of EEG electrodes and recording procedures, this cannot be done in freely behaving animals during home cage recordings, open field tests or various behavioural tasks. Therefore, the placement of EEG electrodes in mice is currently achieved by surgically implanting them into the brain, fixing the electrodes on the skull using dental cement, and then connecting them to a polygraph via a commutator and tether. Using telemetry devices and loggers eliminates the need for tethers and commutators in the system, but the implantation of such devices into the skull is still done by invasive surgical procedures. Even for a well-trained scientist, the total duration for the implantation of EEG electrodes in a mouse typically requires at least 30-45 min. A long-lasting implantation procedure, particularly long-lasting narcosis, poses specific stress to the animal and leads to subsequent impairment of recovery with potential loss of the animal. The implantation of telemetry devices intraperitoneally is especially problematic because it is considered a major surgery that could cause post-surgical complications and interfere with the results of the experiment. Additionally, the cost associated with animal surgeries is high (stereotaxic instrument, surgical supplies, dental cement, screw electrodes, isoflurane, use of a surgical room, etc). Further, a non-surgical procedure for placing EEG electrodes in a mouse is currently unavailable.

Thus, the present disclosure introduces a novel means of recording EEG in mice. To avoid the negative effects of surgical procedures required for the implantation of a telemetry device or logger, the present disclosure introduces a non-surgical procedure for placing EEG electrodes in a mouse. According to the new procedure, a stage connected to thin barbed pin electrodes that can be fixed to the skull by simply applying pressure on the stage after putting it on the mouse head. This procedure is considered non-surgical because it is minimally invasive and does not involve cutting. Since the stage placement procedure is very brief and efficient, it is well suited for high-throughput studies in mice that require EEG analysis in large number of animals. Thus, the present disclosure presents a novel research platform for research and development of clinical treatments of neurodegenerative and other diseases with great commercial potential.

BRIEF DESCRIPTION

In accordance with an embodiment of the disclosure, a head stage, capsule containing a miniature telemetry device, and data logger device for recording biopotentials in freely moving animals and methods for their use are disclosed. The device allows recording EEG, EMG, ECG, temperature, blood pressure, locomotion and other physiological parameters from small animals including rats, mice and birds.

In accordance with an embodiment of the present invention, the present disclosure provides the description of the head stage that is designed for non-surgical placement of EEG electrodes in small animals. The stage is connected to thin barbed pin electrodes of multiple lengths, such that they can be placed into the brain at the chosen depth. A miniature device comprising a wireless transmitter or data logger can be attached using magnets or connectors to the stage. When the head stage is placed on the head of a small animal and pressure is applied on the stage, the set of pin electrodes penetrate the skull, such that the stage becomes firmly fixed to the skull. Further, the device may be placed into the capsule that has a shape and size that allows positioning it on the bone under the skin of a small animal. Further, the device includes electrodes on its body that eliminate the need of wires for EEG recordings. Furthermore, the electrodes of the device can either be flat or made in the form of a sharp metal pin, barbed or not barbed. When the capsule including sharp electrodes is pressed toward the skull, the electrodes penetrate the bone, thus fixing the capsule onto the skull and allowing a better-quality recording of biopotential signals from the brain.

In accordance with another embodiment of the present invention, the present disclosure provides the description of the method for placing the telemetry or logger devices on the top of the mouse head. Currently, the placement of a device for recording biopotentials in a small animal involves surgical procedures that are invasive and time-consuming. The present disclosure discloses a method of the device placement that does not require a surgery and can be done within a few minutes. According to this method, the animal is briefly anesthetized with isoflurane or intraperitoneal injection of an anesthetic (e.g., ketamine-xylazine solution). The head of the animal is shaved, treated with antiseptic, and placed into a rubber holder that is used to make sure that the mouse is not damaged during the stage placement. Then, the head stage is placed on the top of the mouse head at the desired location. The selection of the location for the stage placement is assisted by a grid fabricated specifically for the use with the rubber holder. Additionally, a strip of rubber is placed under the head stage. To attach the stage to the animal head, a pressure is steadily applied on the head stage toward the skull. The set of pin electrodes penetrate through the bone and become locked as they are barbed. Further, the strip of rubber under the head stage ensures that the pin electrodes do not penetrate into the brain too deep. The strip of rubber is removed after the stage is attached to the mouse head, and the animal is returned to its home cage for recovery.

In accordance with another embodiment of the present invention, a capsule including a telemetry device or data logger device is placed under the skin on the head of the animal via a large-diameter needle. A small incision in the skin is made to facilitate the placement of the capsule. In such a case, the wound is then closed using a tissue adhesive or suture. The capsule remains fixed on the skull because it is held by the pin electrodes that penetrate the bone. In addition, a tissue adhesive or bone glue can be used to fasten the capsule on the top of the skull.

Further, recordings of biopotentials can be performed for weeks or months when the device is constantly charged via wireless charging coils. If loggers are used, or telemetry transmitters operate at a different radio frequency signal bandwidth, the recordings can be performed from several animals in the same cage.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
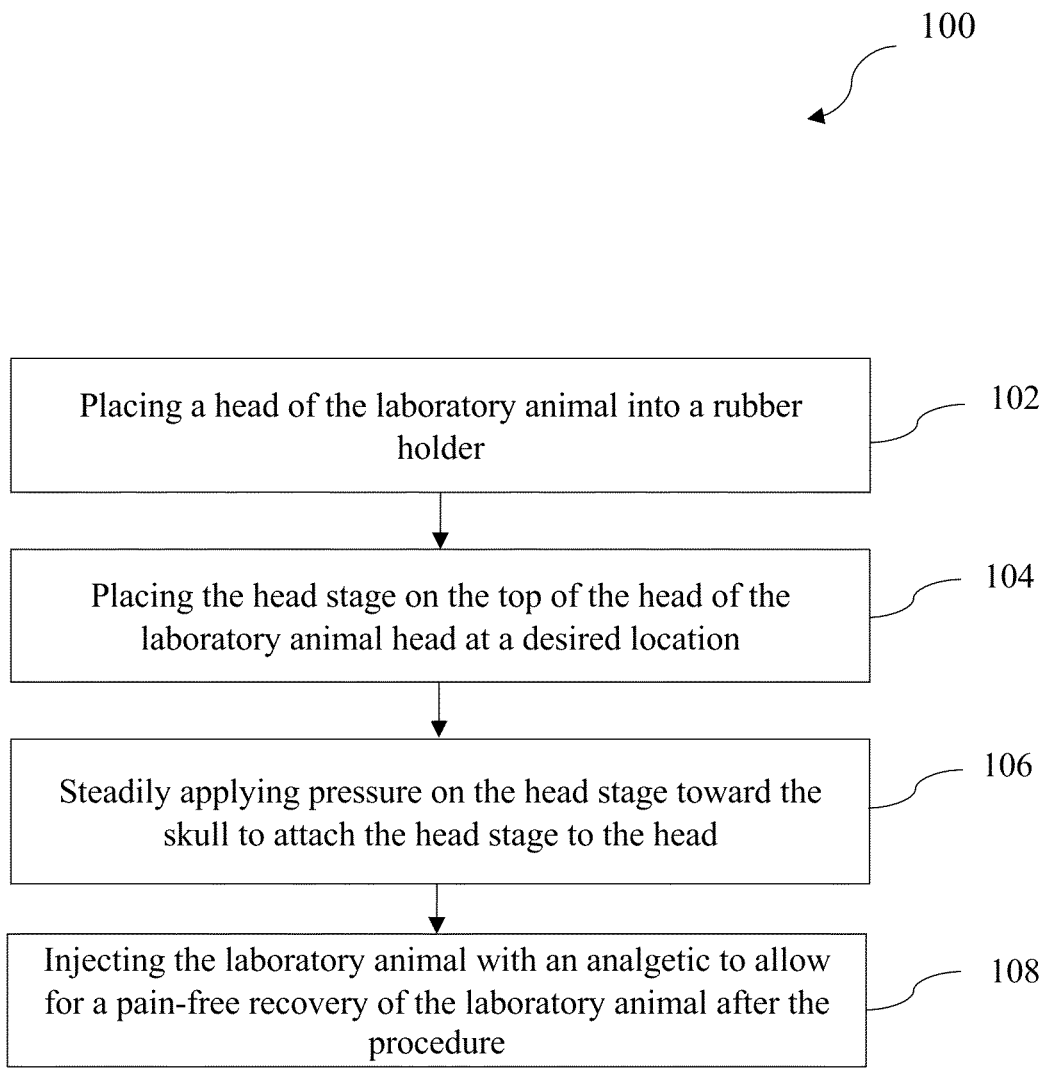
FIG. 1 is a process flow diagram illustrating an exemplary method for placing a head stage for connecting a telemetry transmitter or logger on top of a skull of a laboratory animal, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 16, where similar reference characters denote corresponding features consistently throughout the figures, there are shown preferred embodiments and these embodiments are described in the context of the following exemplary system and/or method.

FIG. 1 is a process flow diagram illustrating an exemplary method 100 for placing a head stage for connecting a telemetry transmitter or logger on top of a skull of a laboratory animal, in accordance with an embodiment of the present disclosure. At step 102, the method 100 includes placing a head of the laboratory animal into a rubber holder. In an exemplary embodiment of the present disclosure, the laboratory animal may be small in size. For example, the laboratory animals may be mice. In an embodiment of the present disclosure, the laboratory animal is briefly anesthetized by using one or more means prior to placing the head into the rubber holder. In an exemplary embodiment of the present disclosure, the one or more means include gas anesthetic and intraperitoneal injection of an anesthetic-containing solution. In an embodiment of the present disclosure, the neck and head area of the laboratory animal are shaved subsequent to anesthetizing operation.

At step 104, the method 100 includes placing the head stage on the top of the head of the laboratory animal head at a desired location. In an embodiment of the present disclosure, the location is selected for the stage placement is assisted by a grid.

At step 106, the method 100 includes steadily applying pressure on the head stage toward the skull to attach the head stage to the head. In an embodiment of the present disclosure, a set of pin electrodes penetrate through bone and become locked because the set of electrodes are barbed.

At step 108, the method 300 includes injecting the laboratory animal with an analgetic to allow for a pain-free recovery of the laboratory animal after the procedure. In an exemplary embodiment of the present disclosure, the analgetic corresponds to meloxicam.

Further, a strip of rubber is placed under the head stage during the stage fixing procedure. The strip of rubber under the head stage ensures that the set of pin electrodes do not penetrate into the brain too deep. In an embodiment of the present disclosure, the strip of rubber is removed after the head stage is attached to the mouse head.

In operation, a polygraph, miniature telemetry device, or data logger is connected with the small animal for recording biopotentials is disclosed. The head stage including barbed pin electrodes is fixed on the head of an animal by applying pressure on the head stage, so that barbed pin electrodes penetrate the bone and get fixed to the skull. Then, wires coming from a polygraph, telemetry transmitter, data logger, battery, or any other device can be connected to the head stage and held above the skin on the head of an animal. Alternatively, a telemetry device can be placed in a capsule under the skin via a small puncture or incision in the skin. The capsule may include either flat electroencephalogram electrodes or pin electroencephalogram electrodes that can penetrate the skull when pressure is applied on the capsule. Further, the capsule may also include electromyogram electrodes, temperature sensor, and sensors of other physiological signals. The capsule is fixed to the skull because pin electrodes hold it to the bone. Furthermore, the capsule may also be fixed to the bone using tissue adhesive or bone cement. The entire placement procedure takes only a few minutes. Further, the biopotentials are recorded by a receiver plate, which may also charge the battery via wireless charging coils. The method allows a user to record biopotentials of an animal that freely moves in the cage and interacts with other animals. Additionally, it allows high-throughput recordings of biopotentials in freely moving animals.

Figure 2:
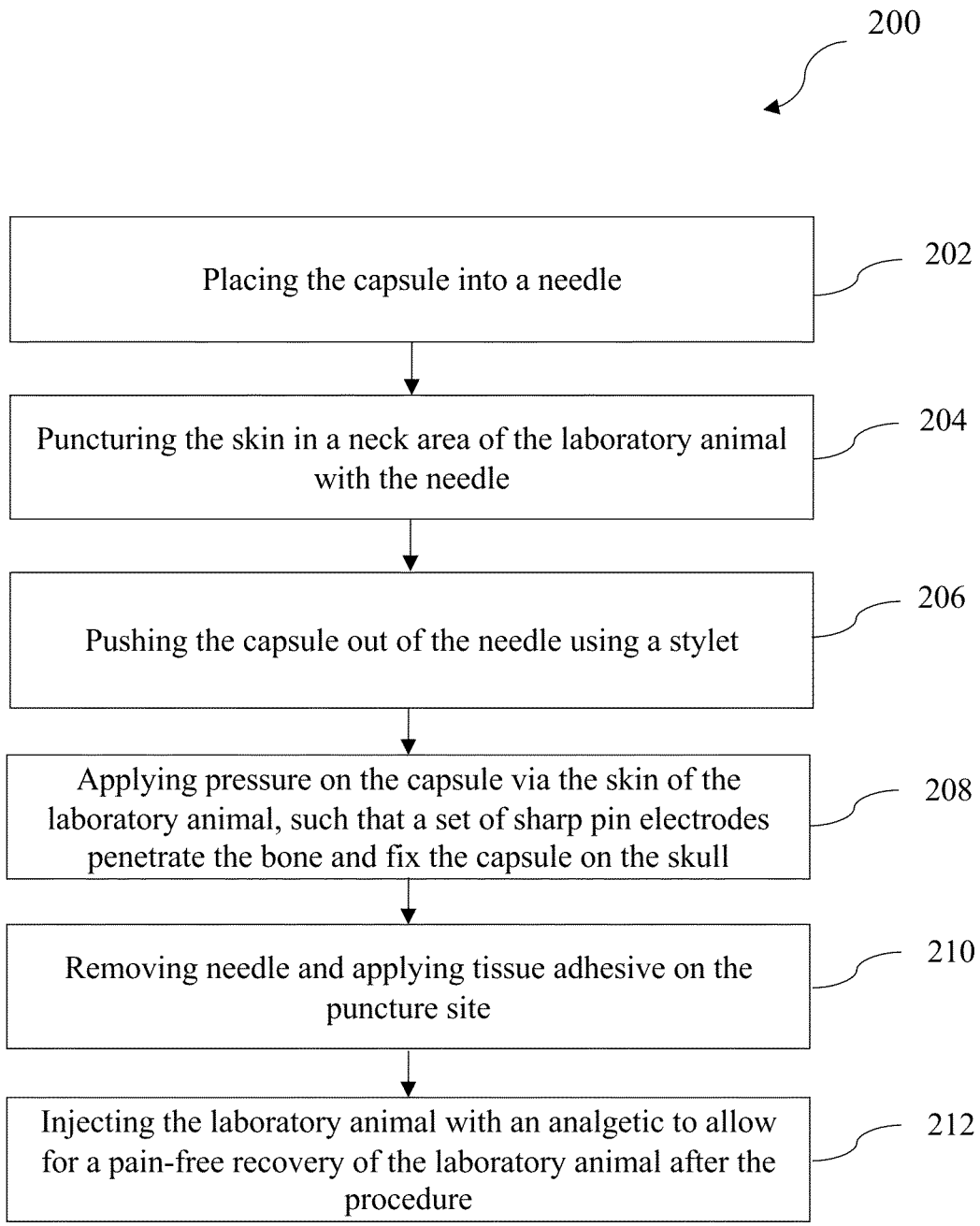
FIG. 2 is a process flow diagram illustrating an exemplary method for placing a capsule comprising a telemetry transmitter or logger on top of a skull of a laboratory animal, in accordance with an embodiment of the present disclosure.

FIG. 2 is a process flow diagram illustrating an exemplary method 200 for placing a capsule comprising a telemetry transmitter or logger on top of a skull of a laboratory animal, in accordance with an embodiment of the present disclosure.

At step 202, the method 200 includes placing the capsule into a needle. In an embodiment of the present disclosure, the laboratory animal is briefly anesthetized by using one or more means prior to placing the capsule into the needle. In an exemplary embodiment of the present disclosure, the one or more means include gas anesthetic and intraperitoneal injection of an anesthetic-containing solution. In an embodiment of the present disclosure, the neck and head area of the laboratory animal are shaved subsequent to anesthetizing operation.

At step 204, the method 200 includes puncturing the skin in a neck area of the laboratory animal with the needle.

At step 206, the method 200 includes pushing the capsule out of the needle using a stylet.

At step 208, the method 200 includes applying pressure on the top of the capsule via the skin of the laboratory animal, such that a set of sharp pin electrodes penetrate the bone and firmly fix the capsule on the top of the skull.

At step 210, the method 200 includes removing needle and applying tissue adhesive on the puncture site.

At step 212, the method 200 includes injecting the laboratory animal with an analgetic to allow for a pain-free recovery of the laboratory animal after the procedure.

Figure 3:
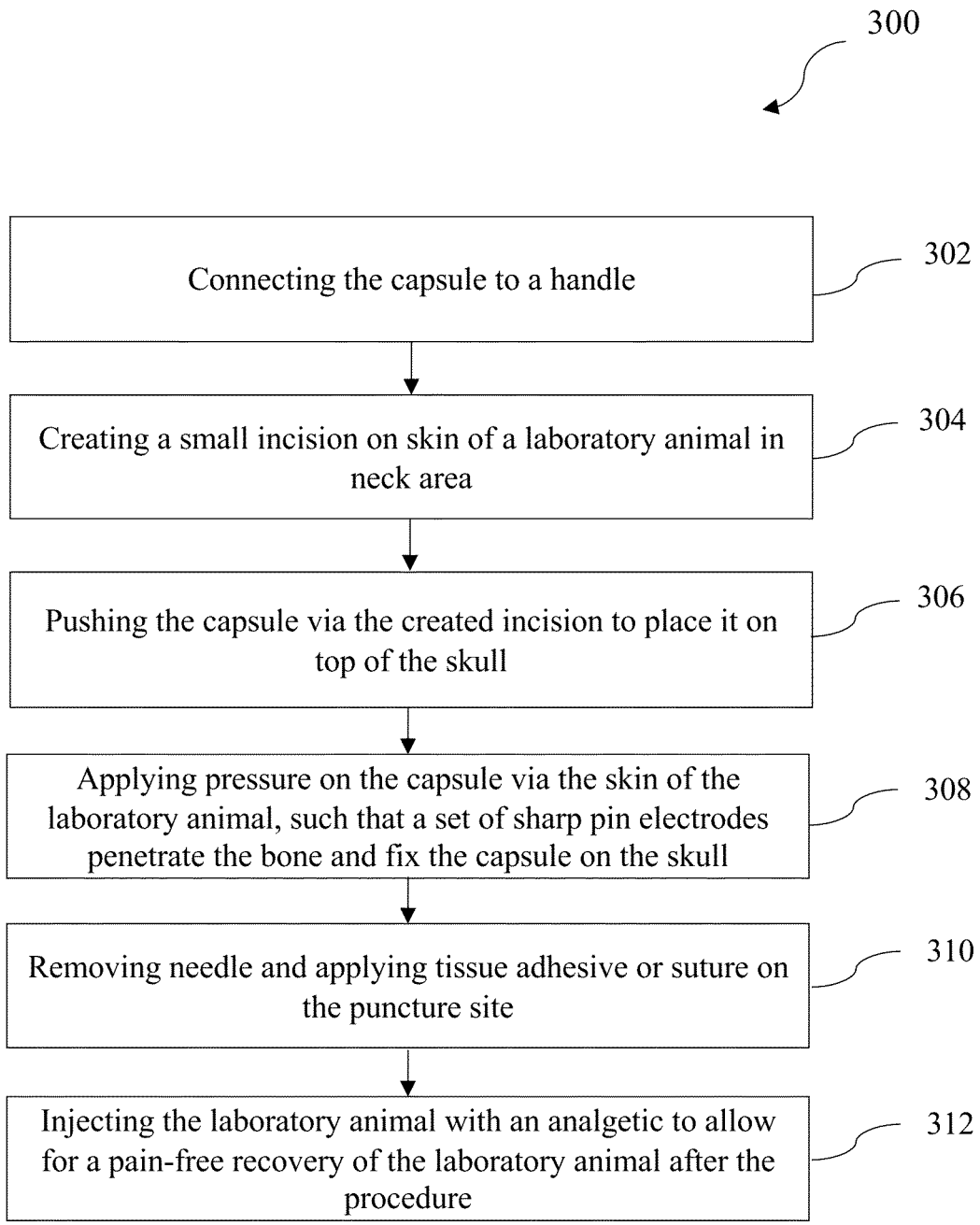
FIG. 3 is a process flow diagram illustrating an exemplary method for placing a capsule comprising a telemetry transmitter or logger on top of a skull of a laboratory animal, in accordance with an embodiment of the present disclosure.

FIG. 3 is a process flow diagram illustrating an exemplary method 300 for placing a capsule comprising a telemetry transmitter or logger on top of a skull of a laboratory animal, in accordance with an embodiment of the present disclosure.

At 302, the method 300 includes connecting the capsule to a handle. In an embodiment of the present disclosure, the laboratory animal is briefly anesthetized by using one or more means prior to connecting the capsule to the handle. In an exemplary embodiment of the present disclosure, the one or more means include gas anesthetic and intraperitoneal injection of an anesthetic-containing solution. The neck and head area of the laboratory animal are shaved subsequent to anesthetizing operation.

At step 304, the method 300 includes creating a small incision on skin of a laboratory animal in neck area.

At step 306, the method 300 includes pushing the capsule via the created incision to place it on top of the skull.

At step 308, the method 300 includes applying pressure on top of the capsule via the skin of the laboratory animal, such that a set of sharp pin electrodes penetrate the bone and firmly fix the capsule on the top of the skull.

At step 310, the method 300 includes removing the needle and applying one of: tissue adhesive and suture on the puncture site.

At step 312, the method 300 includes injecting the animal with an analgetic to allow for a pain-free recovery of the animal after the procedure.

In an embodiment of the present disclosure, a plastic tube is used in place of the needle to place the capsule comprising the telemetry transmitter or the data logger. Further, a set of thin wires are inserted into the muscles or placed on the muscles to serve as electromyogram electrodes. Furthermore, a tissue adhesive or bone glue is applied on the body of the capsule to glue it on the top of the skull. Further, a midline incision of the skin is made to facilitate more precise placement of the capsule on the skull and to allow the placement of a capsule of a larger size. In an embodiment of the present disclosure, set of sharp pin electrodes connected with a telemetry transmitter or a logger by using mechanical or magnetic connectors.

Further, in the head stage, a set of pin electrodes, a connector and a set of EMG electrodes are fixed to a Printed Circuit Board (PCB). Furthermore, in the head stage, the set of sharp pin electrodes are connected to torsion springs. In an embodiment of the present disclosure, the pressure exerted by the springs allows for stronger fixation of the head stage in the bone.

In an embodiment of the present disclosure, a miniature device including a telemetry transmitter or a data logger, sharp or flat electrodes, charging coils, and battery that is shaped to fit into a capsule for placing under the skin on the top of the animal's skull. The miniature device also includes one or more LEDs that allow performing optogenetic studies. Further, the miniature device includes a set of sockets on the body of the head stage or capsule that allow replacing disposable sharp pin electrodes, which may be shaped to allow locking them in the bone at specific depth. Furthermore, the miniature device includes a multichannel electrode.

Figure 4:
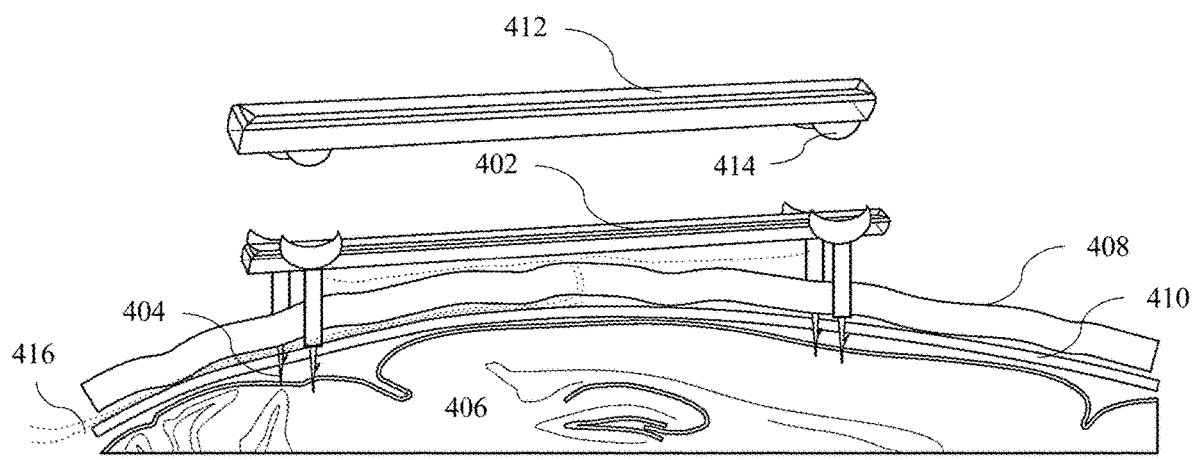
FIG. 4 is a schematic representation of the system for non-surgical implantation of EEG electrodes in small laboratory animals, in accordance with an embodiment of the present disclosure.

FIG. 4 is a schematic representation of the system for non-surgical implantation of EEG electrodes in small laboratory animals, in accordance with an embodiment of the present disclosure.

In an embodiment of the present disclosure, the head stage 402 connected to a set of thin barbed pin electrodes 404 is placed on the head of a small animal and pressure is applied on the head stage 402. Further, 406 represents brain, 408 represents skin and 410 represents the skull of the laboratory animal. The set of pin electrodes penetrate the bone, such that the head stage 402 becomes firmly fixed to the skull 410. Further, the miniature device includes a telemetry transmitter or data logger 412 attached using magnets to the stage, which allows continuous EEG recordings. 414 represents a magnetic electric connector. Additionally, electromyogram (EMG) electrodes 416 is added to the system by using a non-surgical procedure that requires puncturing skin with a needle.

Figure 5:
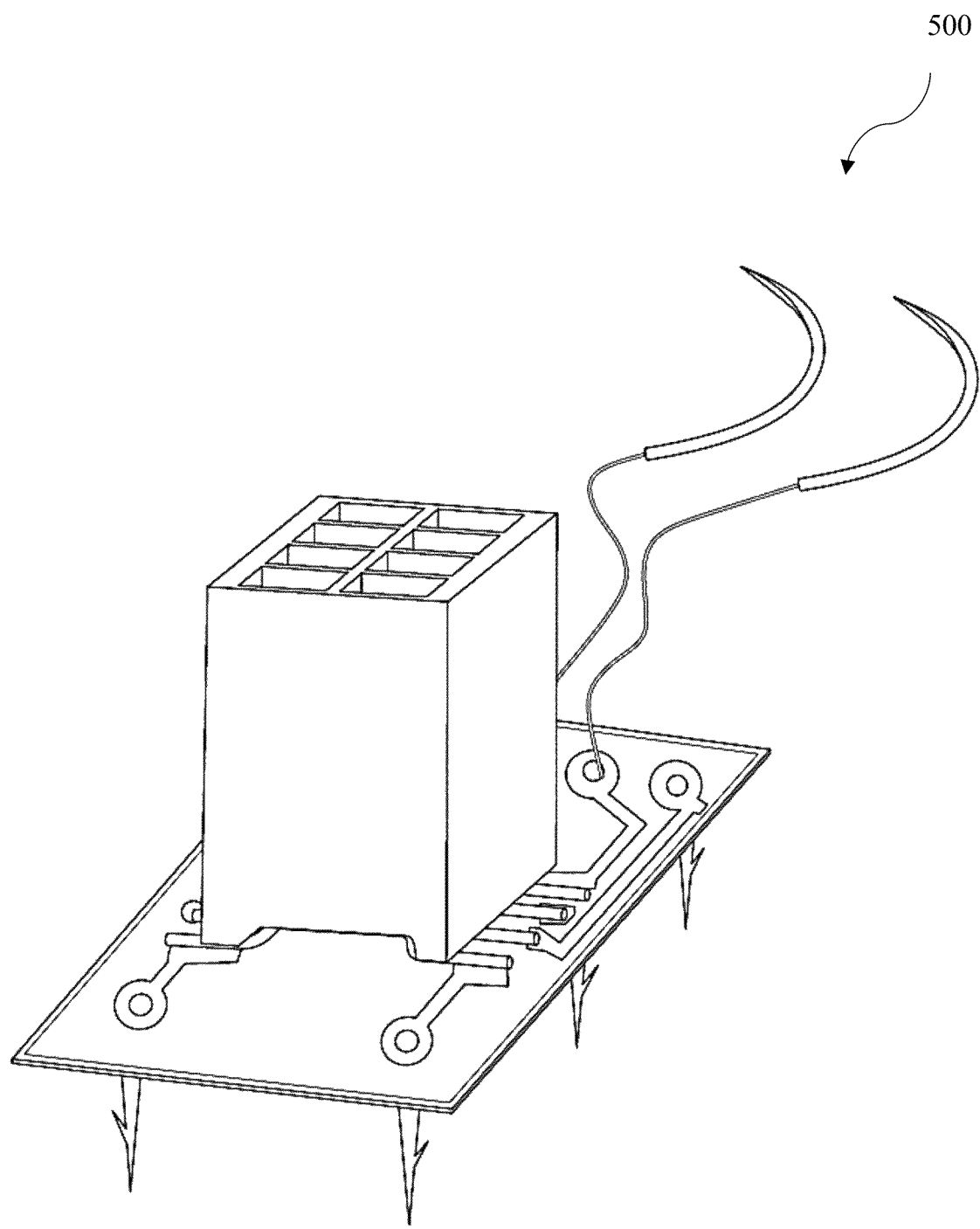
FIG. 5 is a perspective view of a connector, in accordance with an embodiment of the present disclosure.

FIG. 5 is a perspective view 500 of a connector, in accordance with an embodiment of the present disclosure. In an embodiment of the present disclosure, a connector, wire EMG electrodes and barbed pin electrodes can be fixed on a PCB.

Figure 6:
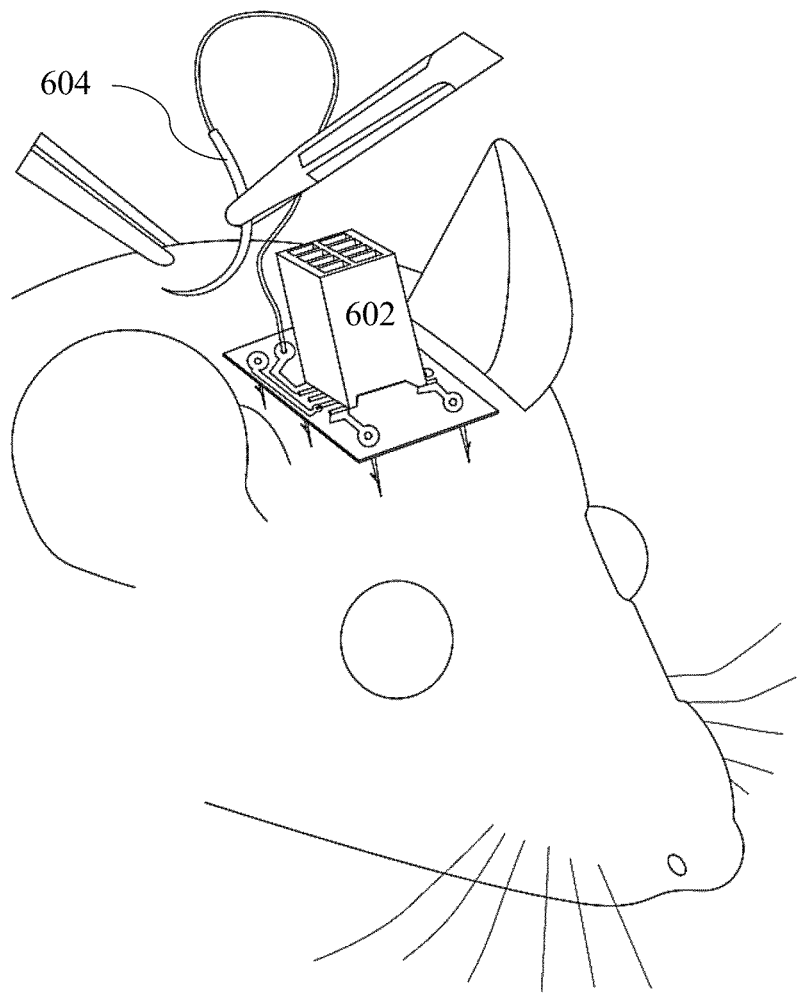
FIG. 6 is a perspective view of wire EEG electrodes placed using a surgical needle, in accordance with an embodiment of the present disclosure.

FIG. 6 is a perspective view of wire EEG electrodes 602 placed using the surgical needle 604, in accordance with an embodiment of the present disclosure. In an embodiment of the present disclosure, the EEG electrodes 602 are positioned above the neck muscle under the skin. Further, the wire electrode is cut above the skin and the skin is pulled up using forceps so that the wire electrode stays under the skin.

Figure 7:
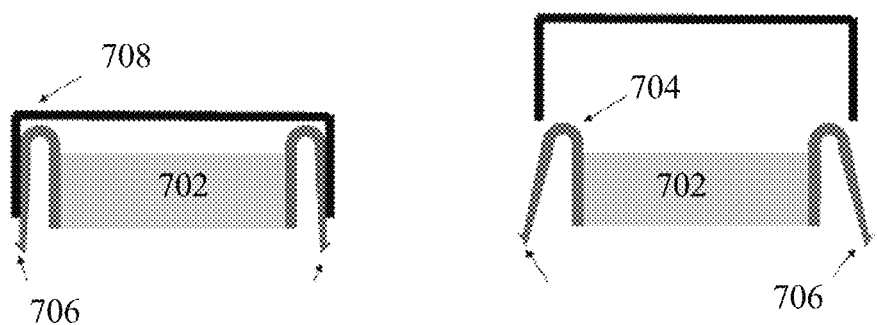
FIG. 7 is a perspective view of a head stage, in accordance with an embodiment of the present disclosure.

FIG. 7 is a perspective view of a head stage, in accordance with an embodiment of the present disclosure.

In an embodiment of the present disclosure, the head stage 702 fixation in the bone can be strengthened by using torsion springs 704. After the barbed electrodes 706 penetrate the bone, the torsion spring holder 708 is removed. The rotational force of the torsion spring 704 helps to keep the stage well-fixed in the bone.

Figure 8:
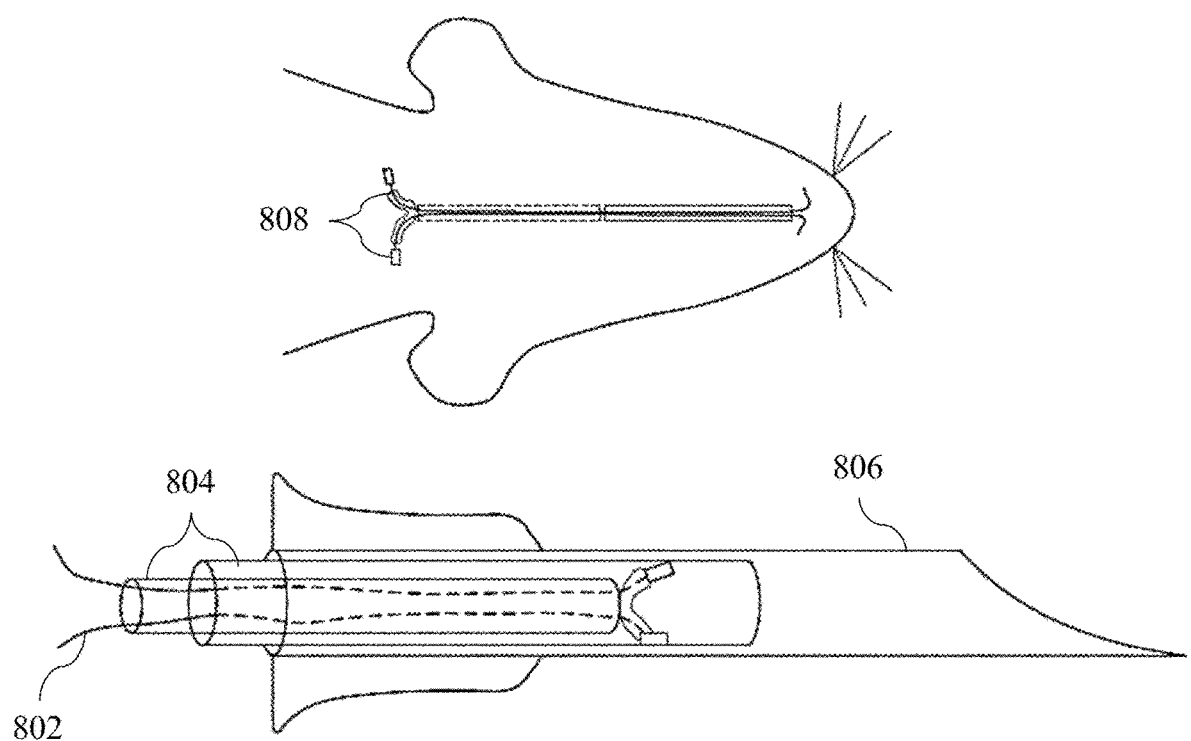
FIG. 8 is a schematic representation of placement of EMG electrodes in mice, in accordance with an embodiment of the present disclosure.

FIG. 8 is a schematic representation of placement of EMG electrodes in mice, in accordance with an embodiment of the present disclosure.

In an embodiment of the present disclosure, two thin EMG wires 802 are placed inside of two tubes 804 and the needle 806. The skin on the top of the mouse head is punctured with the needle 806, and tubes 804 including EEG electrodes 808 are pushed under the skin until they reach the nuchal muscles. The tubes 804 are slowly removed leaving the EMG electrodes and wired under the skin. Then, the head stage is placed on the mouse head and EMG wires are connected with two of the connectors on the head stage; the remaining two connectors are used to record EEG.

Figure 9:
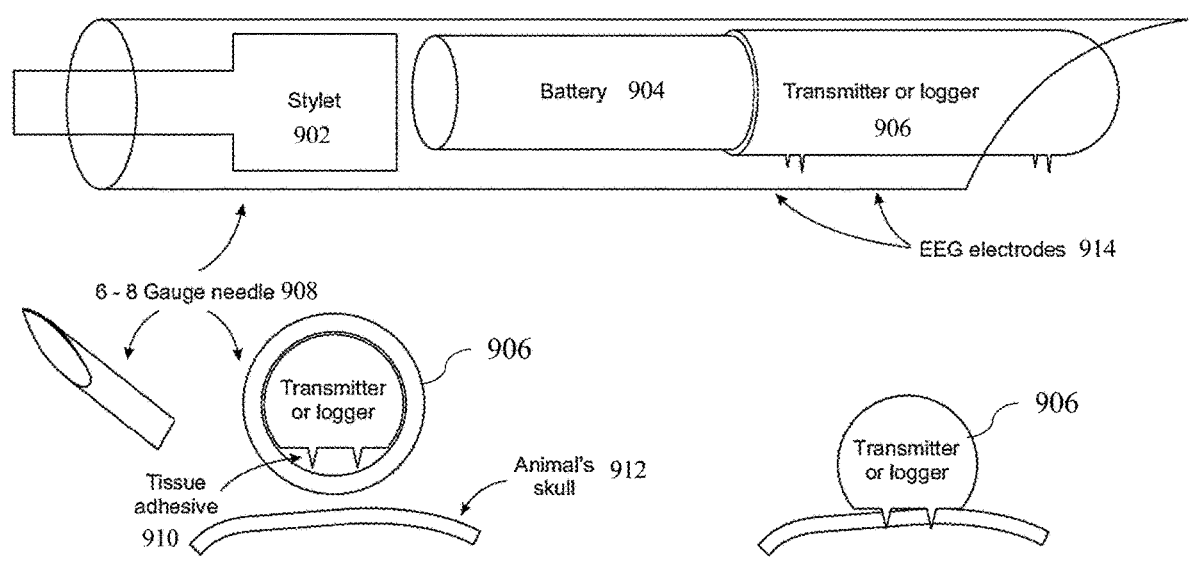
FIG. 9 is a schematic representation of a procedure of placing a capsule comprising a transmitter or logger under the skin on the head of the laboratory animal, in accordance with an embodiment of the present disclosure.

FIG. 9 is a schematic representation of a procedure of placing a capsule comprising a transmitter or logger under the skin on the head of the laboratory animal, in accordance with an embodiment of the present disclosure.

As depicted, 902 represents a stylet, 904 represents a battery, 906 represents a transmitter or a logger, 908 represents a 6-8-gauge needle, 910 represents a tissue adhesive, 912 represents animal's skull, and 914 represents EEG electrodes. In an embodiment of the present disclosure, a pressure is applied on top of the needle 908 to fix the capsule to the skull 912 and the needle 908 is pulled out. Further, the EEG electrodes 914 penetrate the skull 912 and hold the capsule or the capsule may be glued to the bone. In an embodiment of the present disclosure, the capsule remains under the skin.

Figure 10:
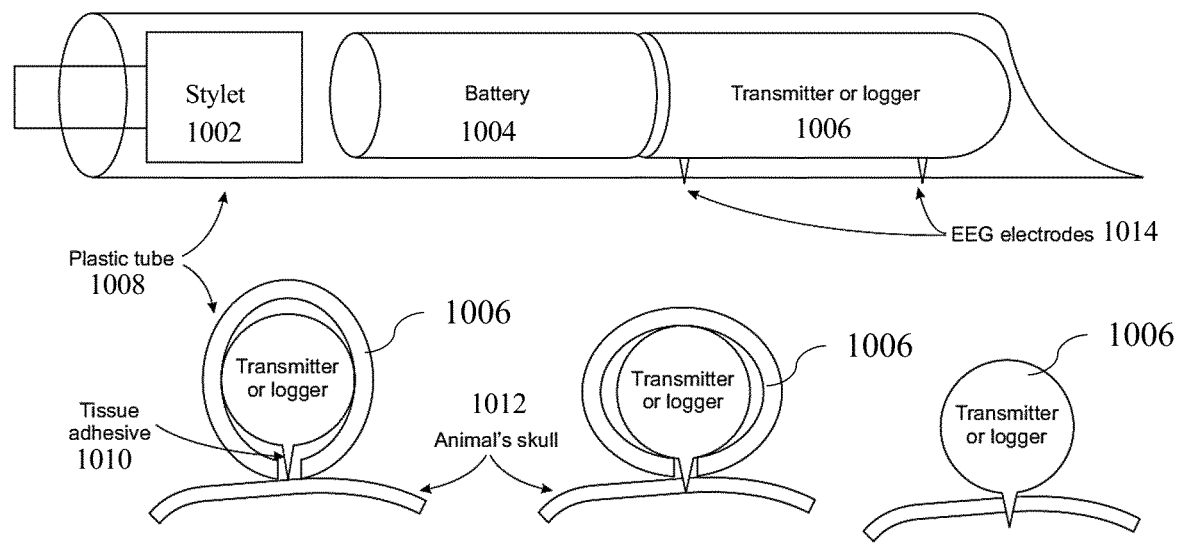
FIG. 10 is a schematic representation of a procedure of placing a capsule comprising a transmitter or logger under the skin on the head of the laboratory animal in which a plastic tube is used instead of the needle, in accordance with an embodiment of the present disclosure.

FIG. 10 is a schematic representation of a procedure of placing a capsule comprising a transmitter or logger under the skin on the head of the laboratory animal in which a plastic tube is used instead of the needle, in accordance with an embodiment of the present disclosure.

As depicted, 1002 represents a stylet, 1004 represents a battery, 1006 represents a transmitter or a logger, 1008 represents a plastic tube, 1010 represents a tissue adhesive, 1012 represents animal's skull, and 1014 represents EEG electrodes. At step 1016, a pressure is applied on top of tube 1008 to fix the capsule to the skull 912 and the tube 1008 is pulled out. At step 1018, the EEG electrodes 914 penetrate the skull 1012 and hold the capsule or the capsule may be glued to the bone. In an embodiment of the present disclosure, the capsule remains under the skin.

Figure 11:
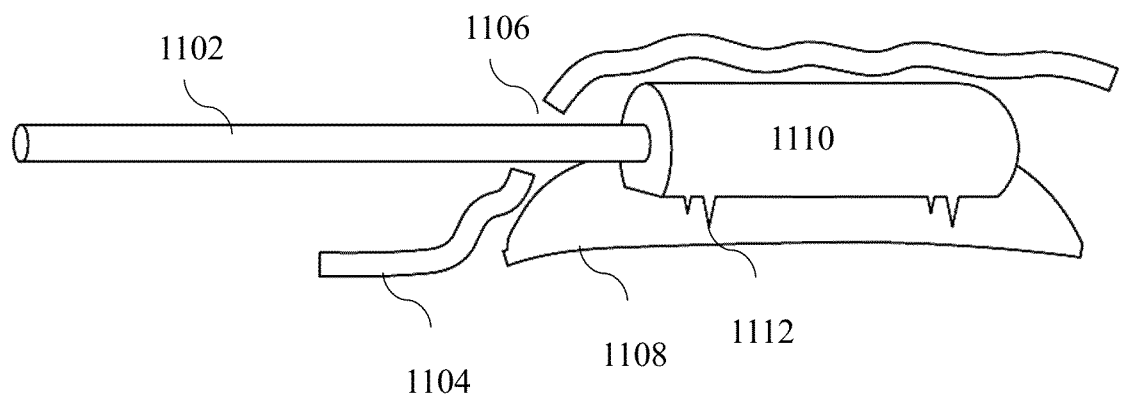
FIG. 11 is a schematic representation of a procedure of pulling the handle out, in accordance with an embodiment of the present disclosure.

FIG. 11 is a schematic representation of a procedure of pulling the handle out, in accordance with an embodiment of the present disclosure.

As depicted, 1102 represents the handle, 1104 represents the skin, 1106 represents an incision in the skin, 1108 represents the animal's skull, 1110 represents a battery and transmitter/logger, and 1112 represents EEG electrodes. In an embodiment of the present disclosure, a pressure is applied on the top of the capsule to fix into the skull 1108. Further, handle 1102 is disconnected by twisting it, such that the handle 1102 is pulled out.

Figure 12:
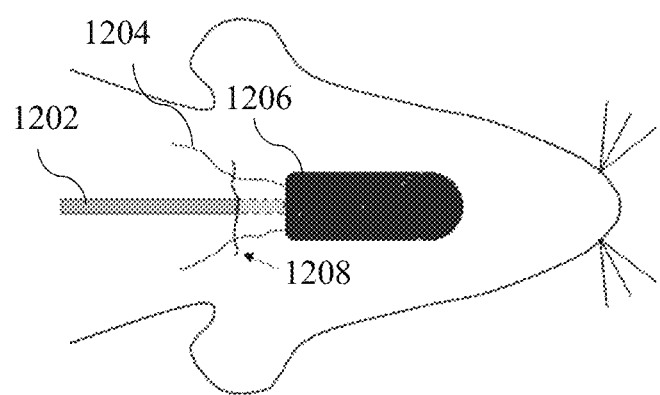
FIG. 12 is a schematic representation of a procedure placing the capsule on the head of the laboratory animal, in accordance with an embodiment of the present disclosure.

FIG. 12 is a schematic representation of a procedure placing the capsule on the head of the laboratory animal, in accordance with an embodiment of the present disclosure.

As depicted, 1202 represents the handle, 1204 represents an EMG wire, 1206 represents the battery and transmitter/logger, and 1208 represents an incision. In an embodiment of the present disclosure, the capsule is placed including a transmitter or logger 1206 under the skin on the head of the laboratory animal. In an embodiment of the present disclosure, the placement of the capsule is assisted by the handle 1204.

Figure 13:
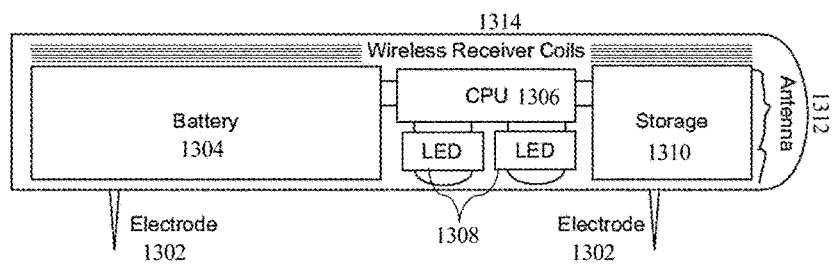
FIG. 13 is a block diagram depicting wireless receiver coils and a set of LEDs, in accordance with an embodiment of the present disclosure.
Figure 13:
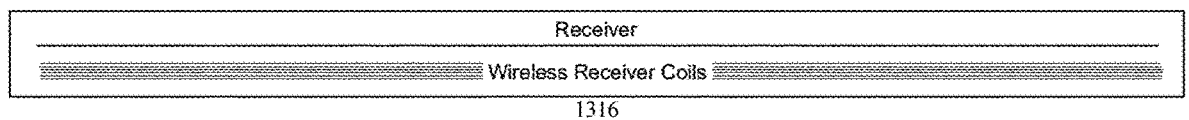

FIG. 13 is a block diagram depicting wireless receiver coils and a set of LEDs, in accordance with an embodiment of the present disclosure.

As depicted, 1302 represents electrodes, 1304 represents battery, 1306, represents CPU, 1308 represents a set of LEDs, 1310 represents storage, 1312 represents antenna, 1314 represents wireless receiver coils, and 1316 represents receiver wireless charging coils.

Figure 14:
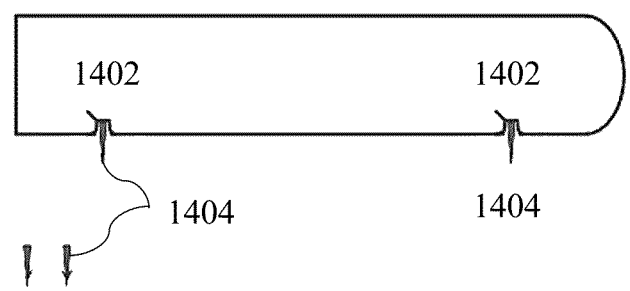
FIG. 14 is a schematic representation depicting the use of disposable barbed pin electrodes, in accordance with an embodiment of the present disclosure.

FIG. 14 is a schematic representation depicting the use of disposable barbed pin electrodes, in accordance with an embodiment of the present disclosure.

As depicted, 1402 represents sockets and 1404 represents the disposable barbed pin electrodes. The disposable pin electrodes 1404 may be shaped to allow locking them in the bone.

Figure 15:
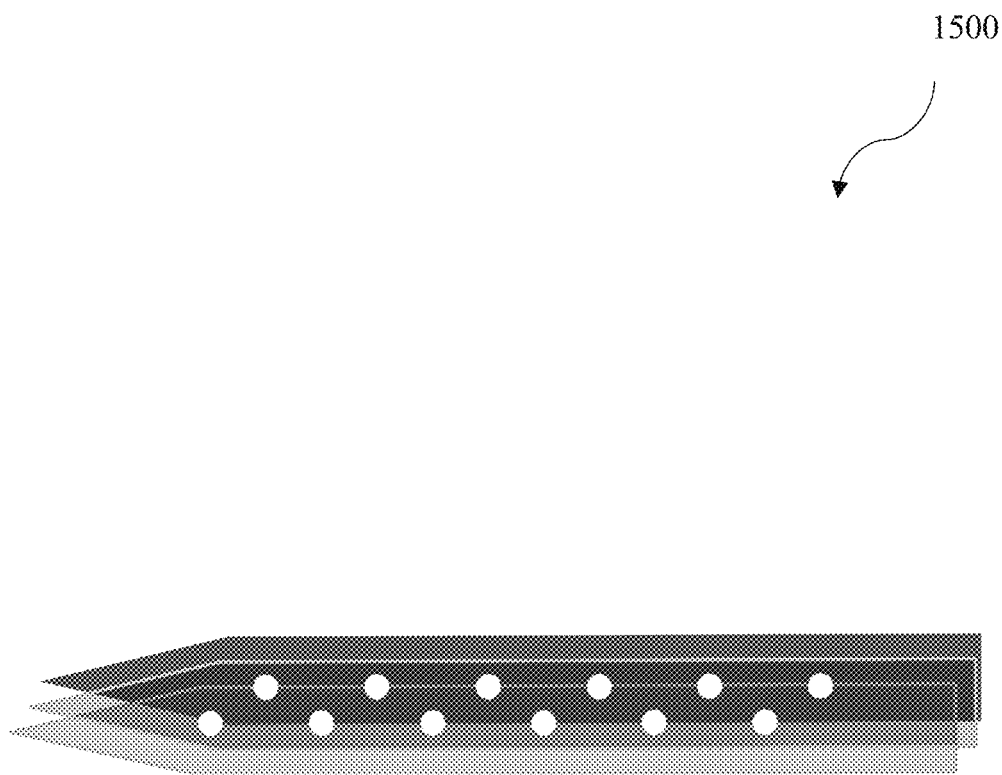
FIG. 15 is a schematic representation of an electrode array, in accordance with an embodiment of the present disclosure.

FIG. 15 is a schematic representation of an electrode array 1500, in accordance with an embodiment of the present disclosure.

In an embodiment of the present disclosure, the electrode array 1500 is located between two metallic protective covers. Further, one of the two metallic protective covers may be slid out after it is inserted into the brain.

Figure 16:
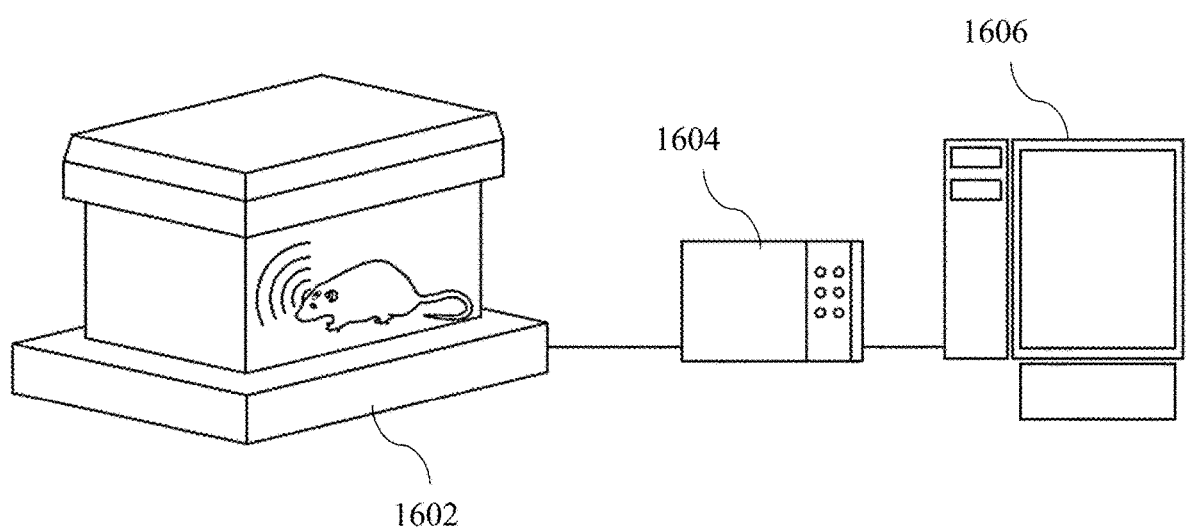
FIG. 16 is a schematic representation of computing environment for high-throughput recording of biopotentials in animals, in accordance with an embodiment of the present disclosure.

FIG. 16 is a schematic representation of computing environment for high-throughput recording of biopotentials in animals, in accordance with an embodiment of the present disclosure.

As depicted, 1602 represents receiver plate and charging coils, 1604 represents a data acquisition system and 1606 represents a computer. In an embodiment of the present disclosure, a logger or telemetry transmitter and EEG analysis software are integrated into a single system that allows streamlined placement of electrodes, EEG recording and automated analysis.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A method for placing a head stage for connecting a telemetry transmitter or logger on top of a skull of a laboratory animal, the method comprising:
    placing a head of the laboratory animal into a rubber holder;
    placing the head stage on the top of the head of the laboratory animal head at a desired location;
    steadily applying pressure on the head stage toward the skull to attach the head stage to the head, wherein a set of pin electrodes penetrate through bone and become locked because the set of electrodes are barbed; and
    injecting the laboratory animal with an analgetic to allow for a pain-free recovery of the laboratory animal after the procedure.

2. The method of claim 1, wherein the laboratory animal is briefly anesthetized by using one or more means prior to placing the head into the rubber holder, and wherein the one or more means comprise gas anesthetic and intraperitoneal injection of an anesthetic-containing solution.

3. The method of claim 2, wherein the neck and head area of the laboratory animal are shaved subsequent to anesthetizing operation.

4. The method of claim 1, wherein the location is selected for the stage placement is assisted by a grid.

5. The method of claim 1, wherein the analgetic corresponds to meloxicam.

6. The method of claim 1, wherein a strip of rubber is placed under the head stage during the stage fixing procedure, wherein the strip of rubber under the head stage ensures that the set of pin electrodes do not penetrate into the brain too deep, and wherein the strip of rubber is removed after the head stage is attached to the mouse head.

7. The method of claim 1, further comprising magnetically attaching a miniature telemetry transmitter or data logger to the head stage after the head stage is fixed to the skull.

8. The method of claim 1, wherein the set of pin electrodes includes electrodes of at least two different lengths, and the method further comprises inserting individual electrodes to predetermined depths within the skull.

9. The method of claim 1, further comprising releasing torsion springs coupled to the pin electrodes so that the springs urge the head stage toward the skull once the electrodes have penetrated the bone.

10. The method of claim 1, further comprising positioning at least one electromyogram electrode integrated into the head stage sub-cutaneously to permit simultaneous electromyogram and electroencephalogram data acquisition.

11. The method of claim 1, further comprising inductively charging a rechargeable battery contained in the telemetry transmitter by wirelessly coupling the transmitter to an external charging coil while the transmitter remains attached to the head stage.

12. The method of claim 1, wherein each pin electrode is provided as a disposable barbed pin and the method further comprises removably inserting each pin into a corresponding socket on the head stage during fixation to the skull.

* * * * *